(12) United States Patent
Korus

(10) Patent No.: US 8,134,969 B2
(45) Date of Patent: Mar. 13, 2012

(54) IP LAYER-HANDOFF USING MOBILITY DOMAINS AND IP CACHING

(75) Inventor: Michael F. Korus, Eden Prairie, MN (US)

(73) Assignee: Motorola Solutions, Inc., Schaumburg, IL (US)

( * ) Notice: Subject to any disclaimer, the term of this patent is extended or adjusted under 35 U.S.C. 154(b) by 375 days.

(21) Appl. No.: 11/558,487

(22) Filed: Nov. 10, 2006

(65) Prior Publication Data

US 2008/0112362 A1 May 15, 2008

(51) Int. Cl.
*H04W 36/00* (2009.01)
*G06F 15/16* (2006.01)

(52) U.S. Cl. .............. 370/331; 455/436; 726/3

(58) Field of Classification Search .......... 370/329, 370/331; 455/436, 439, 442, 432.1; 726/3–21
See application file for complete search history.

(56) References Cited

U.S. PATENT DOCUMENTS

| | | | |
|---|---|---|---|
| 6,473,413 B1 * | 10/2002 | Chiou et al. ................. 370/331 |
| 2002/0085517 A1 * | 7/2002 | Lee et al. ...................... 370/331 |
| 2003/0086390 A1 * | 5/2003 | Eschbach et al. ............. 370/329 |
| 2003/0087646 A1 * | 5/2003 | Funato et al. ................. 455/456 |
| 2004/0202132 A1 * | 10/2004 | Heinonen et al. ............. 370/331 |
| 2005/0099493 A1 * | 5/2005 | Chew .......................... 348/14.08 |
| 2005/0124339 A1 * | 6/2005 | Lau ............................ 455/432.1 |
| 2005/0163078 A1 * | 7/2005 | Oba et al. ..................... 370/331 |
| 2005/0213763 A1 * | 9/2005 | Owen et al. .................. 380/270 |
| 2006/0206597 A1 * | 9/2006 | Kim et al. .................... 709/220 |
| 2007/0206537 A1 * | 9/2007 | Cam-Winget et al. ........ 370/331 |

OTHER PUBLICATIONS

PCT Search Report Dated Mar. 13, 2008.

* cited by examiner

*Primary Examiner* — George Eng
*Assistant Examiner* — Nizar Sivji
(74) *Attorney, Agent, or Firm* — Randi L. Karpinia; Valerie M. Davis; Kenneth A. Haas

(57) ABSTRACT

The disclosure relates to fast roaming techniques which can reduce L3 handoff delay when a mobile access point and/or a mobile host roams back to a previously visited subnet. These fast roaming techniques can allow the mobile access point and/or the mobile host to skip a lengthy DHCP exchange when loading an IP address thereby reducing L3 handoff delays.

14 Claims, 8 Drawing Sheets

IP LAYER-HANDOFF USING MOBILITY DOMAINS AND IP CACHING

FIELD OF THE INVENTION

The present invention relates generally to wireless communications and more particularly to layer 3 (L3) handoff in 802.11 based wireless networks.

BACKGROUND

Types of wireless networks include infrastructure-based wireless networks and ad hoc wireless networks such as those based on Institute of Electronics and Electrical Engineers (IEEE) 802.11 standards.

In some wireless networks, vehicles can be equipped with a mobile access point (MAP) which allows one or more mobile host computers in the vehicle to communicate with other nodes or access points. The mobile host computer(s) in the vehicle can be coupled or wired to the mobile access point. Because the vehicle is mobile, the mobile access point can move within communication range or coverage area of different wired access points (APs) and/or different wireless access points. In some cases, the different wired access points (APs) and/or the different wireless access points belong to different subnets or mobility domains. When the mobile access point roams from a coverage area of an AP which belongs to a first subnet to another coverage area of another AP which belongs to a second subnet, the MAP can perform a layer 3 (L3) handoff from an AP of a first subnet to an AP of a second subnet. However, many of these networks do not provide mechanisms for informing devices connected to a MAP about subnet changes.

BRIEF DESCRIPTION OF THE FIGURES

The accompanying figures, which together with the detailed description below are incorporated in and form part of the specification, serve to further illustrate various embodiments and to explain various principles and advantages all in accordance with the present invention.

Figure 1:
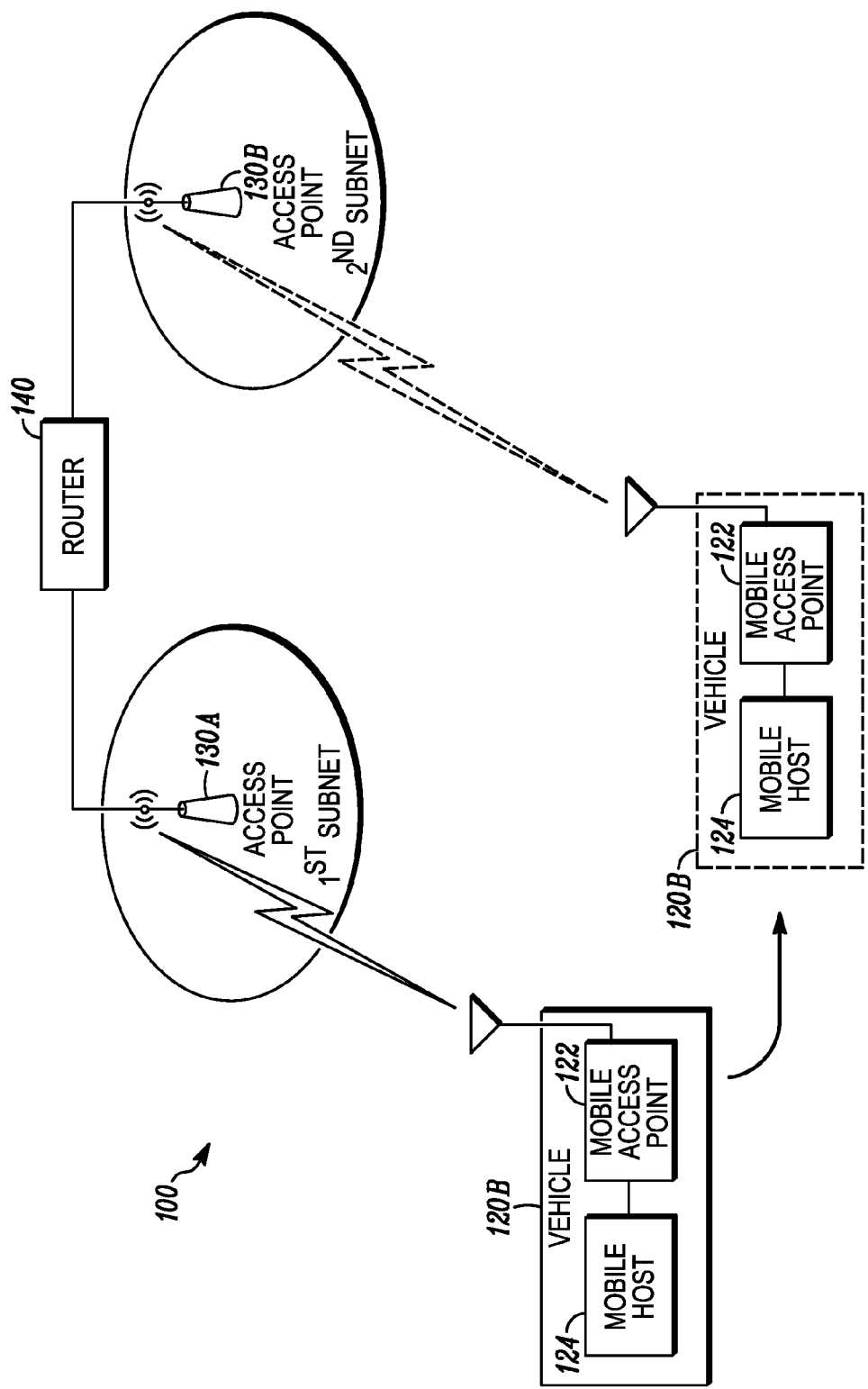
FIG. 1 is a block diagram of an exemplary vehicular network (VN)

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to enabling fast layer 3 (L3) handoff in wireless networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for enabling fast layer 3 (L3) handoff in wireless networks as described herein. The non-processor circuits may include, but are not limited to, a radio receiver, a radio transmitter, signal drivers, clock circuits, power source circuits, and user input devices. As such, these functions may be interpreted as steps of a method for enabling fast layer 3 (L3) handoff in wireless networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Vehicular Network

FIG. 1 is a block diagram of an exemplary vehicular network (VN) 100 which comprises a vehicle 120B comprising a mobile access point (MAP) 122 directly coupled to a mobile host 124, Infrastructure Access Points (IAPs) 130 A, B and a router 140 which couples IAPs 130 A, B. In this document, the MAP 122 is sometimes referred to as a Vehicular Client Bridge (VCB). The IAP 130A is part of a first subnet and IAP 130B is part of a second subnet.

The mobile access point 122 can support operation in both infrastructureless mode and infrastructured mode and can move seamlessly between infrastructure-based networks (those including for example IAPs 130 A, B) and client-based peer-to-peer networks which are free of any infrastructure.

The IAPs 130 A, B are coupled to a wired network and can provide one or more sources of audio, video and/or data information. Depending on the implementation, the IAPs 130 A, B can be coupled to the wired network via a wired or wireless connection. Depending on the implementation, the IAPs 130 A, B can be fixed or mobile. Although not shown, in the network 100, communications to and/or from the MAP 122 can be routed through (i.e., "hop" through) each other to reach other nodes and/or APs in the network 100 including IAPs 130 A, B. The MAP 122 can generally be any one of a number of known wireless devices designed to allow transmitting and/or receiving of packetized audio, video and/or data information. The MAP 122 can exchange information as data packets transmitted over carrier frequencies, each of which includes one or more wireless communication channels.

The mobile host 124 can be any machine which manipulates data according to a list of instructions (e.g., a program). The mobile host 124 can include, for example, a personal computer (PCs), laptop computers (LCs) and mobile computers (MCs). Personal computers include, for example, desktop computers, laptop or notebook computers, personal digital assistants (PDAs), portable computers, tablet computers, wearable computers, etc. Mobile computers encompass appliances such as cellular telephones/devices which comply with any known standard (either ratified or currently being negotiated). The MAP 122 is directly coupled to the mobile host 124 by a wired link (Ethernet cable) or by a wireless link.

In the exemplary scenario shown in FIG. 1, the mobile access point 122 provided in vehicle 120B can communicate with IAPs 130A, 130B when it is within communication range of the IAPs 130A, 130B. The mobile host 124 can communicate with the IAPs 130A, B via the mobile access point 122.

As the vehicle 120B moves through the network 100, the mobile access point 122 roams to or comes within communication range of IAP 130B. Movement of the vehicle 120B to the coverage area of IAP 130B is represented as vehicle 120B transitions from a solid line representation to a dotted line representation. Some of the components in an exemplary mobile access point 122, such as an exemplary processor, transmitter, receiver and antenna, are described below in FIG. 2.

When the vehicle 120B moves through the network 100 from the first subnet to the second subnet, the mobile access point 122 can perform a L3 handoff from IAP 130A to 130B.

Exemplary Mobile Access Point (MAP)

Figure 2:
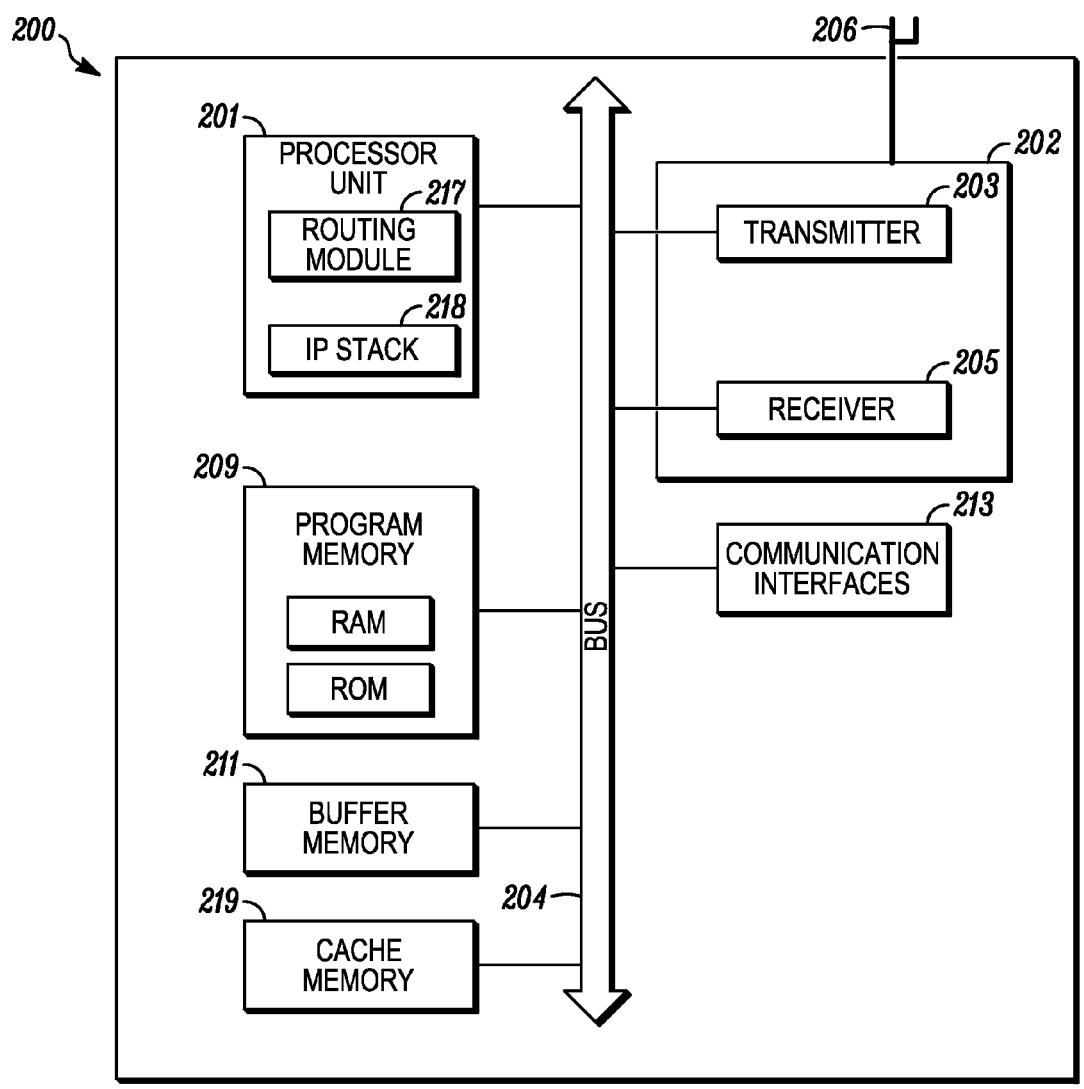
FIG. 2 is a block diagram of an exemplary mobile access point (MAP)

FIG. 2 is a block diagram of an exemplary mobile access point (MAP) 200. The mobile access point (MAP) 200 comprises a processor 201 including a routing module 217 and an Internet protocol (IP) software stack 218, a transceiver 202 including a transmitter circuitry 203 and a receiver circuitry 205, an antenna 206, a program memory 209 for storing operating instructions that are executed by the processor 201, a buffer memory 211, one or more communication interfaces 213, and a cache memory 219. Although not shown, the mobile access point 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The mobile access point 200 is preferably an integrated unit containing at least all the elements depicted in FIG. 2, as well as any other elements necessary for the mobile access point 200 to perform its particular functions. Alternatively, the mobile access point 200 may comprise a collection of appropriately interconnected units or devices, wherein such units or devices perform functions that are equivalent to the functions performed by the elements of the mobile access point 200.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the mobile access point 200 are described in detail below.

The transmitter circuitry 203 and the receiver circuitry 205 enable the mobile access point 200 to communicate information packets to and acquire information packets from other nodes or APs in the network. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface and an ad hoc networking air interface (e.g., BLUETOOTH, 802.11 WLAN (wireless local area network), 802.16 WiMax (Worldwide Interoperability for Microwave Access), and the like).

The implementations of the transmitter circuitry 203 and the receiver circuitry 205 depend on the implementation of the mobile access point 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the mobile access point 200 or insertable into the mobile access point 200 (e.g., embodied in a wireless radio frequency (RF) modem implemented on a Personal Computer Memory Card International Association (PCMCIA) card). The transmitter circuitry 203 and the receiver circuitry 205 are preferably implemented as part of the hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of RF signals from within at least one bandwidth and optionally more bandwidths, if the communications with the proximate device are in a frequency band other than that of the network communications. The receiver circuitry 205 may optionally comprise a first receiver and a second receiver, or one receiver designed to allow receiving within two or more bandwidths. The transceiver 202 includes at least one set of transmitter circuitry 203. The at least one transmitter 203 may be designed to allow transmitting to multiple devices on multiple frequency bands. As with the receiver 205, dual transmitters 203 may optionally be employed where one transmitter is for the transmission to a proximate node or direct link establishment to WLAN's and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the mobile access point 200 is constructed to receive video information from a video source, the mobile access point 200 preferably further includes a video decoder designed to allow decoding the current Moving Picture Experts Group (MPEG) standard or some other video decoding standard. When the mobile access point 200 is further designed to allow transmitting video information, the mobile access point 200 preferably further includes a video encoder designed to allow encoding the video data into at least one of the foregoing video standards. Such video encoder and decoder is preferably implemented as part of the processor 201.

Figure 3:
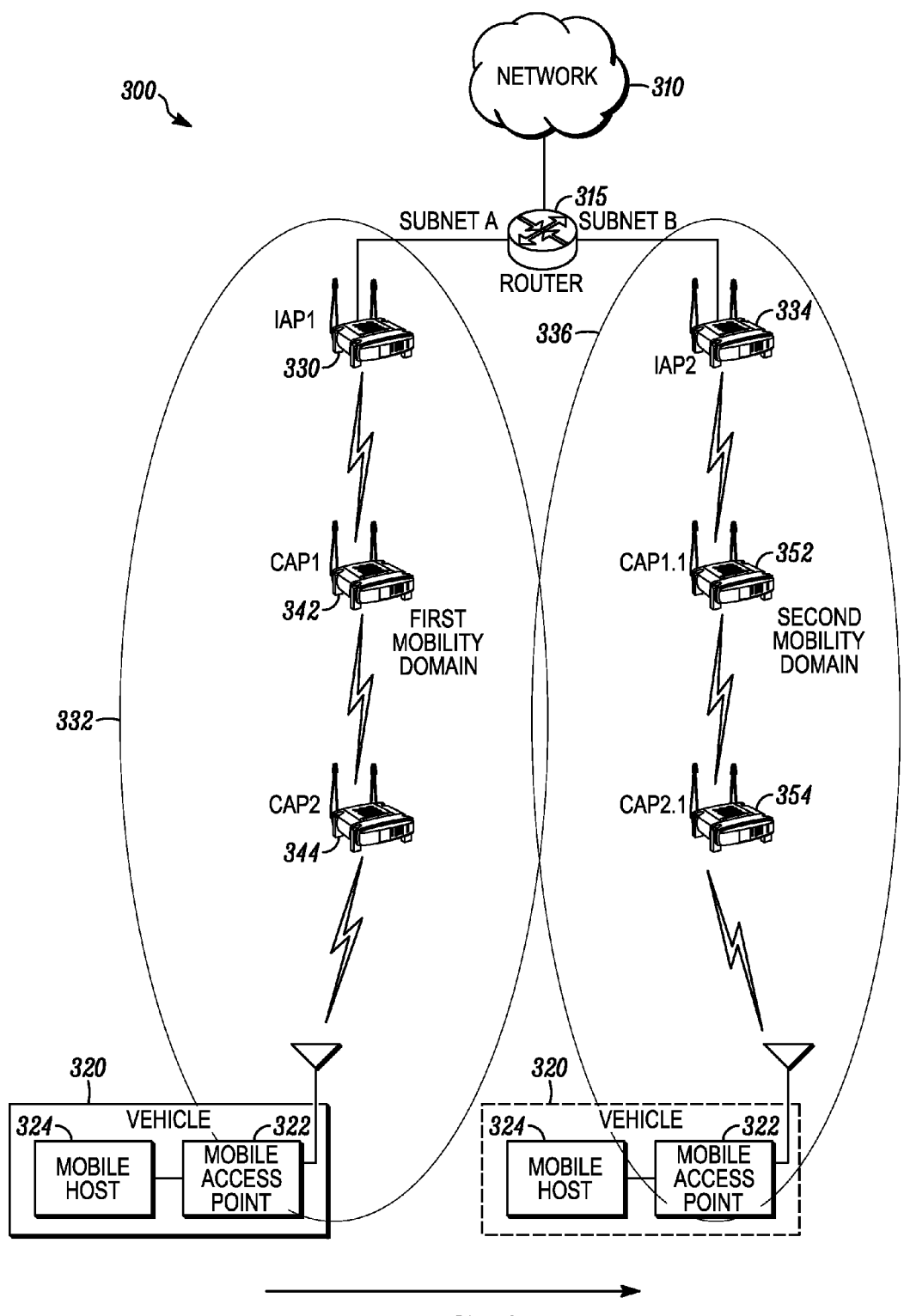
FIG. 3 is a block diagram of an exemplary communication network which illustrates a scenario where a vehicle roams or moves from a first mobility domain (MD) to a second MD.

FIG. 3 is a block diagram of an exemplary communication network 300 which illustrates a scenario where a vehicle including a MAP or "VCB" 320 roams or moves from a first mobility domain 332 to a second mobility domain 336.

The communication network 300 comprises an external network 310 coupled to a router 315, and multiple IP subnets 332, 336 called "Mobility Domains." The term "Mobility Domain (MD)" is synonymous with the term "IP subnet," and both terms are used interchangeably herein. The mobile access point 322 and mobile host 324 communicate with each other over a wired or wireless link.

In this particular example, the IP subnets comprise a first IP subnet A 332 and a second IP subnet B 336, however, it will be appreciated that the communication network 300 can include more than two IP subnets. As used herein, the term "mobility domain" refers to a set of Access Points (APs) in which Layer 2 (L2) fast handoff can occur. Each mobility domain has a unique mobility domain identifier (MDI) associated therewith. As will be described below, the MDI can be used to evaluate opportunities for fast re-establishment of security credentials.

The arrow shown near the bottom of FIG. 3 is provided to indicate movement of the vehicle 320 from the coverage area of the first mobility domain 332 into the coverage area of the second mobility domain 336.

The first mobility domain 332 includes an Infrastructure Access point (IAP) 330 and Coverage APs (CAP) 342, 344. The second mobility domain 336 comprises Infrastructure AP (IAP) 334 and Coverage APs (CAPs) 352, 354.
Layer 3 (L3) Handoff Factors which contribute to layer 3 (L3) handoff delays include (1) time spent detecting an IP subnet change, (2) time spent during a lengthy Dynamic Host Configuration Protocol (DHCP) exchange between a DHCP client and a DHCP server to obtain a new Care-Of-Address ($IP_{CoA}$) and (3) time spent registering the Care-Of-Address ($IP_{CoA}$) with a Home Agent. In one exemplary network environment, IEEE 802.11 WLAN protocols provide no indication of IP subnet or a change in IP subnet connection. For instance, when a mobile host hands off from one AP to another AP, the IEEE 802.11 protocols do not provide information about whether the new AP belongs to the same IP subnet or not. This places detection of IP subnet changes at layer 3 (L3).

Detecting a change in IP subnets can involve a substantial amount of time because layer 3 (L3) of a mobile-IP client must wait for a periodic Router Advertisement message to detect that it changed IP subnets (or must continually poll via router solicitation). This detection process contributes to L3 handoff delay. Moreover, once a new subnet is detected, the DHCP exchange (sometimes referred to as a four-way DHCP handshake) used to obtain a topologically correct IP address ($IP_{CoA}$) further contributes to L3 handoff delay. In addition, in order to receive IP packets from its home network, the mobile-IP client must inform the mobile-IP Home Agent of the client's new care-of address ($IP_{CoA}$). As such, registering the new $IP_{CoA}$ with the Home Agent also contributes to L3 handoff delay.

Overview

The present invention provides techniques and technologies for fast L3 handoff which can reduce L3 handoff delay when acquiring a new IP address and associated subnet configuration. Delays associated with performing L3 handoff can be reduced, for example, by reducing the amount of time it takes for the mobile access point to detect a subnet change and/or reducing the amount of time it takes the mobile access point to acquire a topologically correct IP address and to inform others within the vehicular network that a subnet change occurred. In many L3 handoff scenarios, handoff delays associated with (1) detecting a subnet change (e.g., the time it takes layer 3 (L3) to detect that it changed IP subnets) and (2) obtaining a Care-Of-Address ($IP_{CoA}$) can be reduced significantly.

The first time a DHCP client, such as a MAP or Vehicular Client Bridge (VCB), contacts or visits a particular IP subnet or mobility domain, a full (lengthy) L2 authentication exchange, a full DHCP exchange, and a full Mobile-IP registration takes place.

The present invention provides fast roaming techniques which can reduce L3 handoff delay when a mobile access point and/or a mobile host roams back to a previously visited subnet. These fast roaming techniques can allow the mobile access point and/or the attached mobile hosts to skip a lengthy DHCP exchange when loading an IP address, thereby reducing L3 handoff delays.

According to the provided techniques, IP caching can be used to store IP addressing information (e.g., an IP address, subnet mask, and default gateway) for each IP subnet. In one implementation, an IP subnet is mapped to an IEEE 802.11r Mobility Domain as described in IEEE P802.11r™. In other implementations, an IP subnet may be mapped to a subset of an IEEE 802.11r-Draft 2.2 Mobility Domain as described in IEEE P802.11r™/D2.2, July 2006. When multiple subnets get mapped to single IEEE 802.11r-Draft2.2 Mobility Domain, a second vendor specific information element is appended to the Beacon reflecting the constituent subnet within the Mobility Domain. IP addressing information generated during this process is stored in a cache memory as long as the DHCP address lease is valid. Addressing information associated with the particular subnet or mobility domain (e.g., address, subnet mask, default gateway, domain name server (DNS) server, and the like) can be stored in the IP-information cache for future use. Entries in the IP-information cache can be aged-out per normal DHCP lease time.

During subsequent roams back to a particular subnet (or mobility domain), when the MAP detects a subnet change (e.g., MAP has moved into coverage area of a new subnet), fast handoff techniques are provided in which the MAP can re-use cached IP information for fast L3 handoff by skipping the lengthy DHCP exchange. For example, the MAP can utilize a Mobility Domain information element (MDIE) received in a beacon as an index into a cache of IP addressing information. This can allow for IP addresses to be quickly re-assigned to the MAP when the MAP roams back to previously visited mobility domains/subnets.

According to one implementation of these techniques for fast IP address assignment, upon receiving a beacon and detecting a change in IP subnet (e.g., a change in mobility domain), successfully establishing L2 security, and establishing a route to an IAP, a modem in a mobile access point generates a trigger (e.g., an IP subnet change notification message) and sends it to devices (e.g., a mobile host) attached or coupled to the mobile access point. The handoff delay associated with detecting and reporting an IP subnet change can be reduced by using the trigger to inform the attached devices (e.g., mobile hosts) when the mobility domain changes. The modem in a mobile access point also internally triggers functionality to acquire IP address.

The attached devices can use the IP subnet change notification, which includes a subnet indication (e.g., a Mobility Domain Identifier (MDI)), to index an entry in an IP-information cache. If an entry is not found (e.g., it is the MAP's first contact with the particular subnet or MD), then an IP address can be acquired using a normal, relatively lengthy DHCP exchange. By contrast, if an entry is found in the IP-information cache for the particular mobility domain, a fast IP address assignment technique can be used which allows the mobile access point to skip the lengthy DHCP exchange which normally takes place and directly install the cached IP address information. Thus, these techniques can be used to skip a lengthy DHCP exchange when roaming back to a previously visited subnet(s) (or mobility domains).

The basic steps for a first contact handoff and fast handoff will now be described with reference to FIGS. 4 and 6, respectively.

Figure 4:
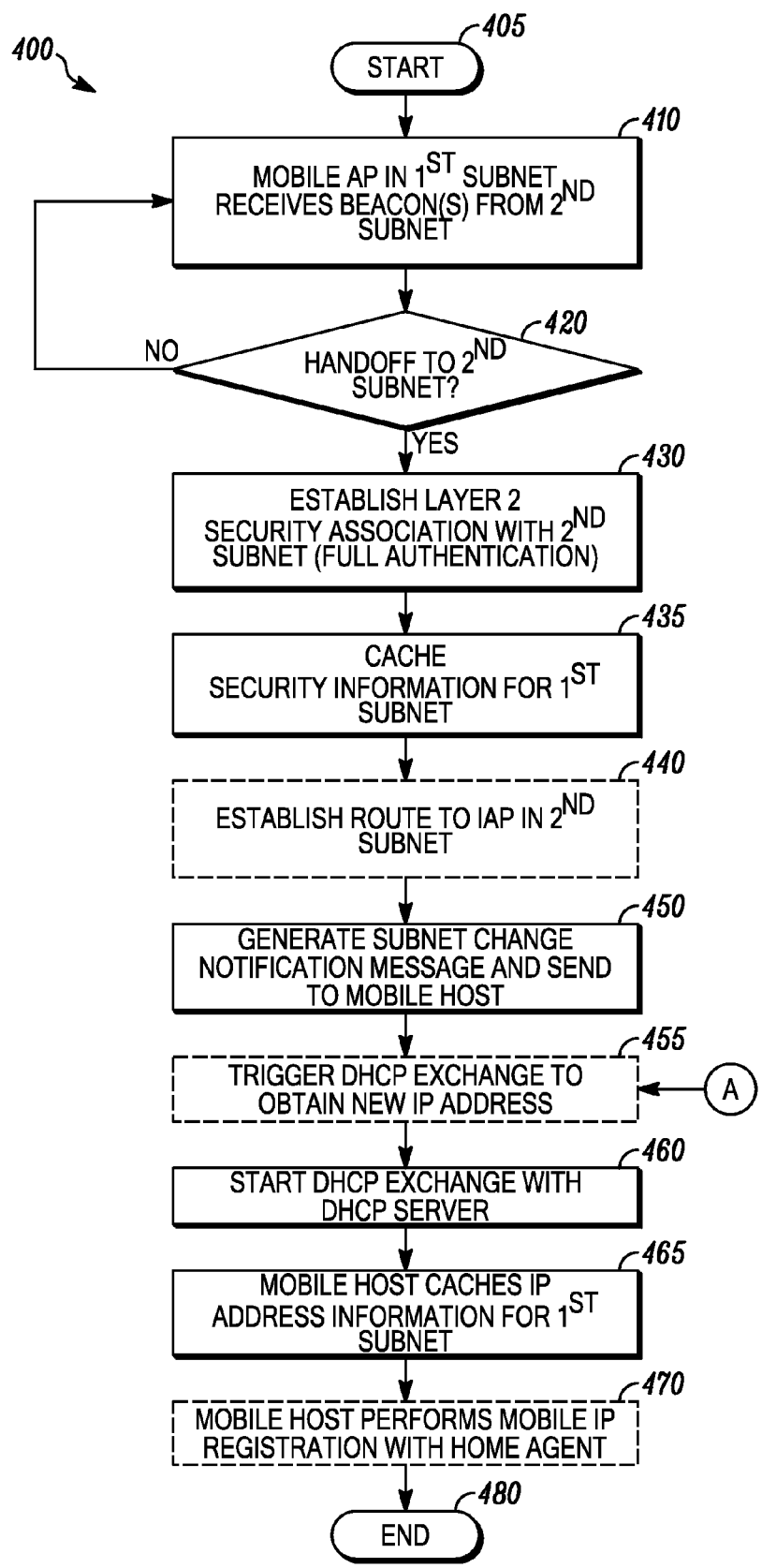
FIG. 4 is a flow chart illustrating an exemplary process 400 for performing a roaming operation the first time a mobile access point moves from a first mobility domain to a second mobility domain in accordance with some embodiments of the invention.

FIG. 4 is a flow chart illustrating an exemplary process 400 for performing a roaming operation the first time a mobile access point 322 moves from a first mobility domain 332 to a second mobility domain 336 for the first time. The first time a mobile access point 322 connects to the new Subnet B or the second mobility domain 336, existing IP subnet change technologies are typically used which can result in lengthy handoff delays.

The process 400 starts at step 405, and at step 410, the mobile access point 322 starts receiving beacons from the second mobility domain 336. The beacon comprises a subnet indication which identifies the second mobility domain 336. One particular example of a subnet change indication can be reflected by a change in the Mobility Domain Information Element (MDIE). The MDIE 500 is used, for example, in the IEEE 802.11r draft standard as described in IEEE P802.11r™. As will be described below, in some implementations, the IEEE 802.11r MDIE can be used not only for L2 fast handoff, but also for triggering fast L3 handoff.

Figure 5:
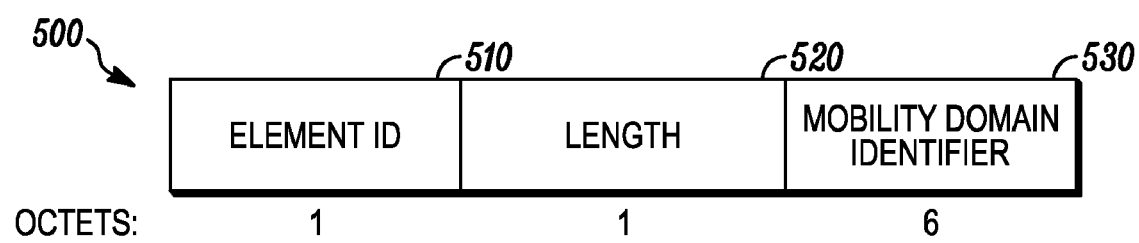
FIG. 5 is a block diagram showing the data structure of a Mobility Domain Information Element (MDIE) carried in a beacon.

FIG. 5 is a block diagram illustrating an exemplary data structure of a Mobility Domain Information Element (MDIE) 500 carried in a beacon. The MDIE 500 comprises an Element Identifier 510, a Length Field 520, and a mobility domain Identifier (MDI) Field 530. In this particular exemplary implementation, the Element Identifier 510 is one octet, a Length Field 520 is one octet, and a mobility domain Identifier (MDI) Field 530 is a six octet string of characters, however, the length of these fields can be different than shown in this example. The mobility domain Identifier (MDI) is not an IP address.

Referring again to FIG. 4, at step 420, the mobile access point 322 determines whether it will hand off from the first mobility domain 332 to the second mobility domain 336. If the mobile access point 322 decides that it will not hand off to the second mobility domain 336, then the process 400 loops back to step 410.

If the mobile access point 322 decides that it will hand off to the second mobility domain 336, then at step 430, the mobile access point 322 undergoes a full authentication process which involves a DHCP exchange to establish a layer 2 (L2) security association with the second mobility domain 336.

At step 435, the mobile access point 322 caches existing security information related to the first mobility domain 332. As will be described below, this cached security information can be used later for a fast roam-back procedure when the mobile access point 322 moves back to the first mobility domain 332.

Step 440 is optional. Assuming step 440 takes place, then at step 440 (assuming a meshed network), routing software in the mobile access point 322 establishes a route to the IAP 434 for communicating in the second mobility domain 336. In many situations, establishment of a route is required for bearer plane communication. For example, routing protocols described in IEEE P802.11s/D0.01, March 2006, Ad hoc On Demand Distance Vector (AODV) or proprietary L2 routing protocols may be used to establish a route.

At step 450, the mobile access point 322 generates a subnet change notification to any attached devices (e.g., such as the mobile host 324) on its Ethernet ports. This subnet change notification message includes a subnet or mobility domain identifier. In addition, the mobile access point 322 can generate a subnet change notification and send it on its wireless vehicular network (VN) interface (e.g., 802.11 interface) to notify wireless clients attached to the VN that the mobile access point 322 has changed subnets.

At optional step 455, the mobile access point 322 also triggers a DHCP message exchange to obtain a new IP address for itself. This step is optional depending on whether the MAP contains IP based applications. Generally APs, whether stationary or mobile, do not host real-time end user applications. However, since they may contain IP services such as an element manager for network management, it's essential they have the capability to acquire new IP addresses upon a subnet change.

At step 460, the mobile host 324 (and any other devices attached to the mobile access point 322) respond to the subnet change notification message received from the mobile access point 322 and start a DHCP exchange with a DHCP server (not shown). This DHCP message exchange is known in the art and will not be described herein.

At step 465, the mobile host 324 caches IP address information associated with the first mobility domain 332. This IP address information can include, for example, information such as the gateway address, DHCP address, the DHCP lease expiration time, IP address, IP subnet mask, and the DNS address (which are all typically acquired in DHCP exchanges).

Step 470 is optional, and is shown only where step 465 is applied in the context of a Mobile IP (MIP) environment. As such, at step 470, if the mobile host 324 is using Mobile-IP, the mobile host 324 attached to the mobile access point 322 can then perform mobile IP registration. This also registers the mobile host(s)'s 324 IP address with the mobile-IP home agent.

Thus, process 400 can be relatively time-consuming. However, in the future when the mobile access point 322 roams back to the Subnet A, then a fast roam-back procedure can be utilized as will now be described with reference to FIG. 6.

Figure 6:
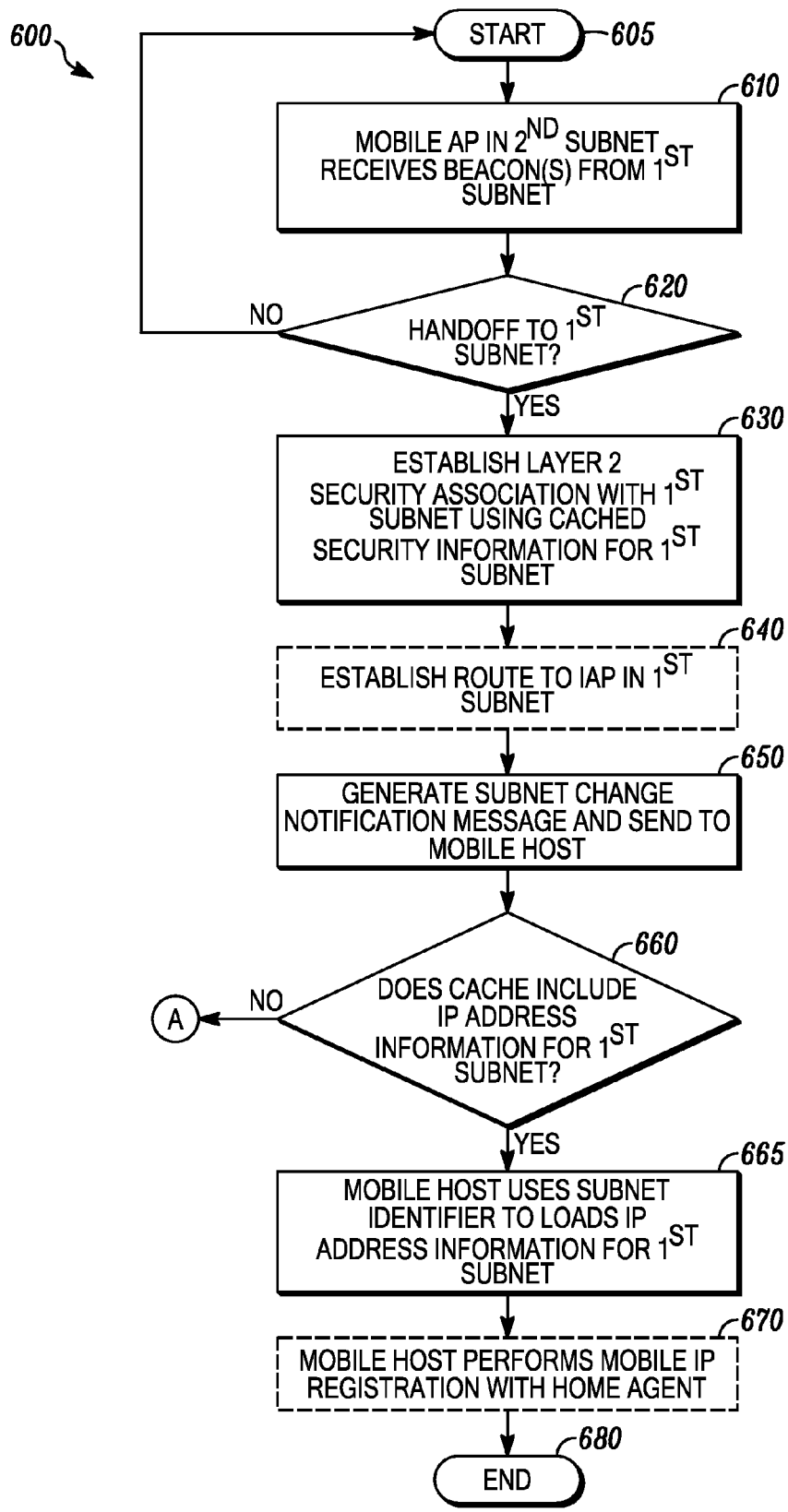
FIG. 6 is a flow chart illustrating an exemplary process for fast roaming in accordance with some embodiments of the invention.

FIG. 6 is a flow chart illustrating an exemplary process 600 for fast roaming in accordance with some embodiments of the invention. The process 600 can be used, for example, when a mobile access point 322 roams back to a first mobility domain 332 from a second mobility domain 336.

The process 600 starts at step 605 when the mobile access point 322 moves back into a new mobility domain which in this particular example is the first mobility domain 332. At step 610, the mobile access point 322 begins receiving beacons transmitted from a device (e.g., an access point) in the first mobility domain 332.

At step 620, the mobile access point 322 determines whether to perform a handoff to the new mobility domain (MD) it has entered. When the mobile access point 322 determines that it will not perform a handoff to the new MD, the process 600 reverts or loops back to step 605.

When the mobile access point 322 determines that it will perform a handoff to the new MD, the process 600 proceeds to step 630, where the mobile access point 322 establishes a Layer 2 (L2) security association with the Infrastructure AP 330 using the cached security credentials that had been previously stored (e.g., at step 435 of FIG. 4). As such the L2 handoff is much faster than the process described for the first handoff since there is no need to go through a full authentication procedure. Rather, the mobile access point 322 can simply use the security information which it had previously cached at step 435 of FIG. 4.

At optional step 640, the routing module in the mobile access point 322 establishes a route to IAP 330. For instance, if the process 600 is implemented in a mesh enabled network, the mobile access point 322 establishes a bearer path with IAP 330 prior to allowing IP bearer traffic to flow (e.g. mobile-IP registration messages). The route can be established using, for example, IEEE 802.11s, AODV or proprietary L2 routing protocols.

At step 650, the mobile access point 322 generates a subnet change notification message and sends it to the attached mobile host 324 (and any other devices attached on its Ethernet ports and optionally on the wireless VN interface).

At step 660, upon receiving the subnet change notification message, the attached mobile host 324 (and any other devices attached on its Ethernet ports), checks a cache memory for an entry associated with the first mobility domain 332. This entry can include, for example, IP address information (e.g., care-of-address ($IP_{CoA}$) information), default gateway, DHCP address, DNS address, DHCP lease expiration, subnet mask, etc. When the attached mobile host 324 does not find an entry for the first mobility domain 332 in the cache, then a full DHCP exchange is required such as that described at steps 455 through 460 of FIG. 4. On the other hand, when the attached mobile host 324 does find an entry associated with the first mobility domain 332 in the cache, then at step 665, the attached mobile host 324 can load the IP address information for the first mobility domain 332 into its IP stack.

Step 670 is exemplary. Specifically, step 670 applies in the context of a mobile IP (MIP) implementation. When implemented, at step 670, the mobile host 324 uses MIP and then performs mobile IP registration with the Home Agent to register the new (cached) Care-of IP (CoA) address. This expedites the mobile-IP handoff such that time to detect a subnet change and time to acquire an IP address are minimized.

As will be described with reference to FIGS. 7 and 8, the concepts of caching IP addresses and using a MDI to determine if the cache includes an entry for a particular mobility domain apply to both to the mobile access point 322 and to the attached mobile host 324.

Figure 7:
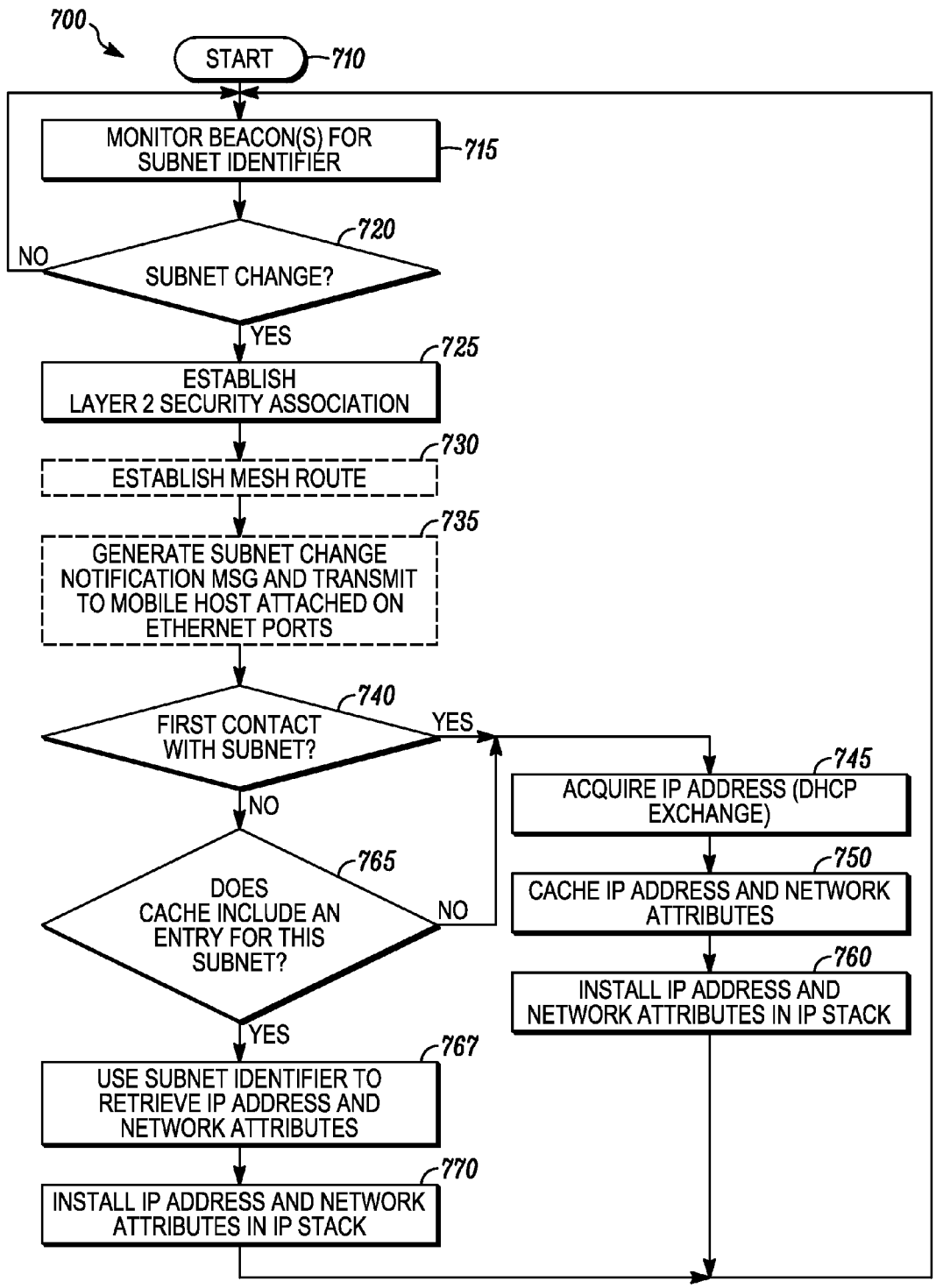
FIG. 7 is a flow chart illustrating an exemplary process performed within a mobile access point when the mobile access point roams to a new mobility domain in accordance with some embodiments of the invention.

FIG. 7 is a flow chart illustrating an exemplary process 700 performed within a mobile access point 322 when the mobile access point 322 roams to a new subnet (e.g., mobility domain) in accordance with some embodiments of the invention.

The process 700 starts at step 710 and at step 715, the mobile access point 322 monitors incoming RF signals for a beacon which includes a subnet identifier (e.g., a mobility domain identifier 530 such as that shown in FIG. 5 above). When the mobile access point 322 receives a subnet identifier (e.g., a MDIE different than a MDIE associated with its current mobility domain), the mobile access point 322 can examine the subnet identifier at step 720 and determine whether or not there has been a change in its current subnet or mobility domain. For example, when the mobile access point 322 moves from a first mobility domain 332 to a second mobility domain 336, the subnet identifier received by the mobile access point 322 would be different and the mobile access point 322 can determine that there has been a change in the subnet (e.g., mobility domain). Alternatively, in another situation where the mobile access point 322 remains within the first mobility domain 332, then the subnet identifier would be the same and there would be no change in the subnet.

When the mobile access point 322 determines that there is no change in the subnet (e.g., mobility domain), the process ends at step 780. Alternatively, when the mobile access point 322 determines that there has been a change in the subnet or mobility domain, then the process 700 proceeds to step 725 where the mobile access point 322 establishes a L2 security association with the IAP 1 330 of the first mobility domain 332.

Step 730 is optional as indicated by the dashed-line or dotted-line box. When the mobile access point 322 is part of a mesh network then at step 730 the mobile access point 322 establishes a mesh route. It will be appreciated that the process 700 can also apply to non-meshed type networks, in which case it would be unnecessary to perform step 730. At step 735, the mobile access point 322 generates a subnet change notification message and transmits the subnet change notification message to any devices (e.g., mobile host 324) attached to its Ethernet ports to notify those attached devices of the subnet change.

In step 740, the mobile access point 322 determines whether this is its first contact with the subnet (e.g., mobility domain) it has entered.

When this is the first contact with the subnet (e.g., mobility domain), then the mobile access point 322 acquires the IP address for itself at step 745, for example, via a DHCP message exchange with a DHCP server. Then, at step 750, the mobile access point 322 stores the IP address and network attributes in a cache for later use. At step 760, the mobile access point 322 installs the IP address and network attributes in its IP stack.

By contrast, when the mobile access point 322 determines that this is not its first contact with the subnet (e.g., mobility domain) (e.g., the mobile access point 322 has already established a contact in this subnet (e.g., mobility domain) and stored or cached its IP address and network attributes), then the process 700 proceeds to step 765 where the mobile access point 322 uses the subnet identifier to determine whether the cache includes an entry (e.g., IP address and other network attributes) for that subnet (e.g., mobility domain). When an entry is not found in the cache for the particular subnet (e.g., mobility domain), then the mobile access point 322 can assume that the IP address lease has expired or aged out and can then undergo a regular DHCP exchange to acquire an IP address similar to that shown at step 745.

When an entry is found in the cache for the particular subnet (e.g., mobility domain), then at step 767, the mobile access point 322 can use information regarding the subnet (e.g., mobility domain) to retrieve an IP address and network attributes associated with the particular subnet (e.g., mobility domain), and at step 770 the mobile access point 322 installs the IP address and other network attributes in its IP stack. It should be appreciated that at step 770, when mobile IP is the particular protocol being used, the IP address attributes retrieved from the cache can be applied to the IP care-of-address.

Figure 8:
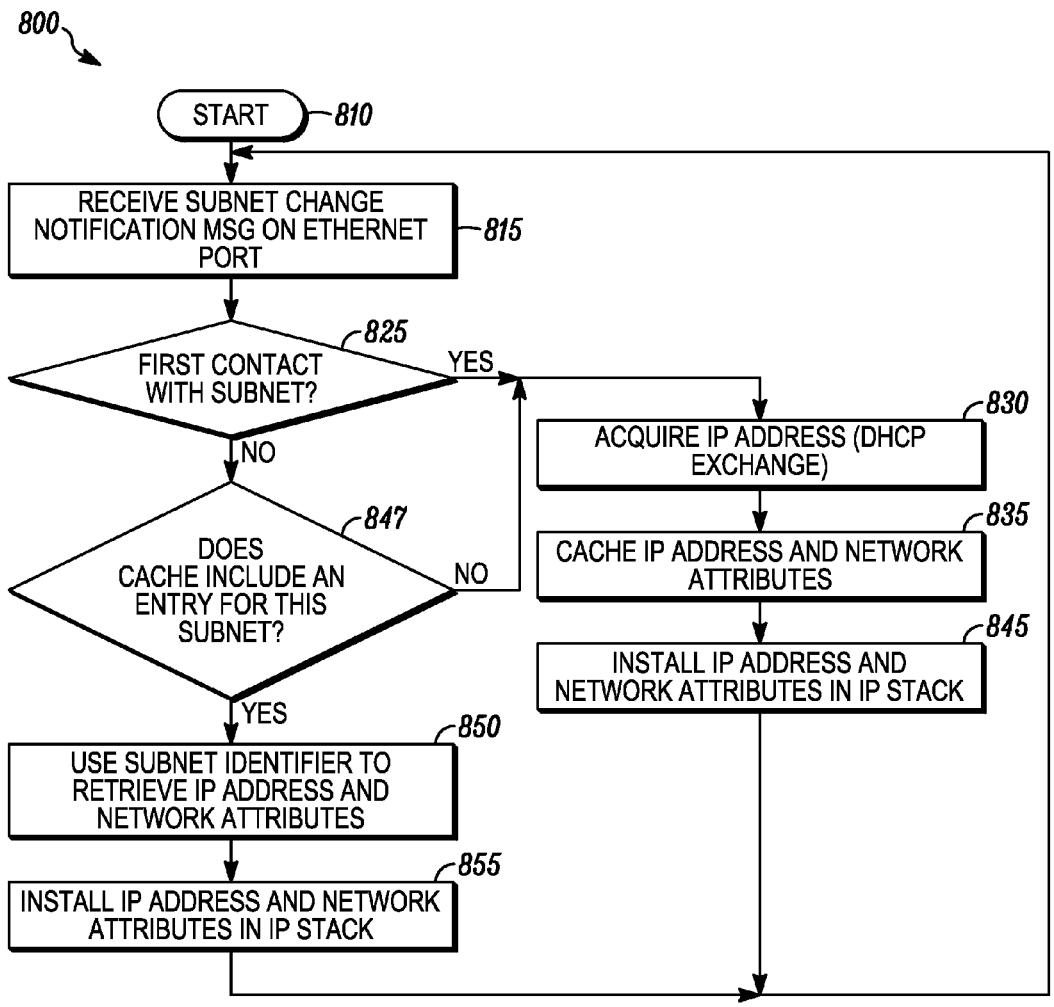
FIG. 8 is a flow chart illustrating exemplary processing performed within a mobile host that is coupled to the mobile access point in accordance with some embodiments of the invention.

FIG. 8 is a flow chart illustrating exemplary processing performed within a mobile host 324 that is coupled to the mobile access point 322 within the vehicle 320 in accordance with some embodiments of the invention.

The process starts at step 810 and at step 815 the mobile host 324 receives a subnet or mobility domain change notification message from the mobile access point 322 on an Ethernet port of the mobile host 324.

When the mobile host 324 realizes that there has been a subnet change then the process 800 proceeds to step 825 where the mobile host 324 determines if this is its first contact with the particular subnet. In other words, the mobile host 324 determines whether or not it has previously attached to the subnet and stored an IP address and other network attributes associated with that particular subnet. In one implementation, once the mobile host 324 has created a mobile-IP based Virtual Private Network (VPN) tunnel and an Internet Protocol Security (IPSEC) tunnel, the mobile host 324 can return to the subnet and the IPSEC tunnel and cached IP addresses in that subnet will still be valid unless they aged out (i.e., an age out time has expired).

When the mobile host 324 determines that it is the first contact with the subnet (e.g., a mobility domain), then at step 830 the mobile host 324 acquires an IP address for itself by undergoing a DHCP exchange with a DHCP server for that subnet. After acquiring an IP address for itself, the mobile host 324 caches the IP address and network attributes at step 835, and then, at step 845 installs the newly acquired IP address and network attributes in the IP stack of the mobile host 324. The process 800 then loops back to step 815.

By contrast, when the mobile host 324 determines at step 825 that this is not its first contact with the particular subnet (e.g., that the mobile host 324 has previously acquired an IP address within that subnet or mobility domain), then at step 847 the mobile host 324 determines whether a cache memory includes an entry for this subnet. For example, the mobile host 324 can use information regarding the subnet (e.g., mobility domain) as an index into the cache memory 840 of the mobile host 324. Each entry in the cache memory 840 includes IP addressing information and other network attributes associated with a particular subnet.

When the mobile host 324 determines that the cache memory does not include an entry for this subnet or mobility domain), then at step 850, the mobile host 324 assumes that the IP address lease has expired or aged out and then performs a normal DHCP exchange as indicated at step 830 to acquire an IP address. Then, at step 835, the mobile host 324 stores the IP address and network attributes in a cache for later use. At step 845, the mobile host 324 installs the IP address and network attributes in its IP stack and the process 800 then loops back to step 815.

When an entry is found in the cache for the particular subnet or MD, then at step 850, the mobile host 324 can use information regarding the subnet or mobility domain to retrieve an IP address and network attributes associated with the particular subnet, and at step 855 the mobile host 324 installs the IP address and other network attributes in its IP stack. The process 800 ends at step 860. It should be appreciated that at step 855, when mobile IP is the particular protocol used, the IP address attributes retrieved from the cache can be applied to the IP care-of-address.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for fast roaming of a mobile access point, comprising in the mobile access point:
    storing internet protocol (IP) addressing information associated with a first subnet in a cache;
    receiving a beacon transmitted from the first subnet when the mobile access point roams back to the first subnet from a second subnet, wherein the beacon comprises a subnet identifier associated with the first subnet and provides L2 WLAN information;
    using the subnet identifier to determine whether the cache includes an entry for the first subnet when the mobile access point has previously established an IP address in the first subnet; and
    loading the IP addressing information associated with the first subnet from the cache into an IP stack
    establishing, at the mobile access point, a layer 2 security association with an infrastructure access point in the first subnet using cached security information that had been previously stored; and
    establishing, at the mobile access point, a route to the infrastructure access point in the first subnet.

2. A method according to claim 1, further comprising:
    transmitting a subnet change notification message from the mobile access point to a mobile host attached to the mobile access point.

3. A method according to claim 1, wherein the mobile access point is located in a vehicle.

4. A method according to claim 3, wherein the mobile access point is a Vehicular Client Bridge (VCB) in the vehicle.

5. A method according to claim 1, wherein the first subnet was previously visited by the mobile access point.

6. A method according to claim 1, wherein the subnet identifier comprises a Mobility Domain Identifier (MDI) field.

7. A method for performing a handoff from a first subnet to a second subnet when a mobile access point roams from the first subnet to the second subnet, the method comprising:
   receiving a beacon transmitted from an access point in the second subnet, wherein the beacon comprises a subnet identifier associated with the second subnet;
   examining the subnet identifier and determining that the mobile access point has entered a new subnet;
   determining whether the mobile access point has previously established an internet protocol address in the second subnet;
   using the subnet identifier to determine whether a cache in the mobile access point includes an entry for the second subnet when the mobile access point has previously established an internet protocol address in the second subnet; and
   using the subnet identifier to retrieve the internet protocol address associated with the second subnet from the cache when an entry is found in the cache for the second subnet
   establishing a layer 2 security association with the infrastructure access point in the second subnet
   establishing a route from the mobile access point to the infrastructure access point.

8. A method according to claim 7, further comprising:
   transmitting a subnet change notification message to a device attached to the mobile access point to notify the attached device of the roam to the second subnet.

9. A method according to claim 7, further comprising:
   installing the internet protocol address and other network attributes in an internet protocol stack of the mobile access point.

10. A method according to claim 9, wherein installing the internet protocol address and other network attributes in an internet protocol stack of the mobile access point comprises:
    installing the internet protocol address and other network attributes as an internet protocol care-of-address in a mobile internet protocol stack of the mobile access point.

11. A method according to claim 7, wherein using the subnet identifier to retrieve the internet protocol address associated with the second subnet from the cache if an entry is found in the cache for the second subnet, comprises:
    using the subnet identifier to retrieve the internet protocol address and network attributes associated with the second subnet from the cache if an entry is found in the cache for the second subnet, wherein the network attributes comprise: a gateway address, DNS address, a DHCP lease expiration time, and a subnet mask.

12. A method according to claim 7, wherein using the subnet identifier to retrieve the IP address associated with the second subnet if the cache memory includes an entry for the second subnet, comprises:
    using the subnet identifier to retrieve the IP address and network attributes associated with the second subnet from the cache if an entry is found in the cache for the second subnet, wherein the network attributes comprise: a gateway address, DNS address, a DHCP lease expiration time, and a subnet mask.

13. A method according to claim 1, wherein the first subnet comprises first and second access points, the first and second access points respectively transmitting first and second beacons each containing the subnet identifier of the first subnet, the method further comprising at the mobile access point:
    receiving the first beacon when the mobile access point roams back to an area serviced by the first access point from an area serviced by the second access point; and
    determining that the mobile access point has not roamed to a subnet different from the first subnet based on the received subnet identifier of the first beacon.

14. A method according to claim 2, wherein the mobile host and the mobile access point are disposed within a vehicle.

* * * * *